Jan. 3, 1967 R. L. NELSON 3,296,460

PARITY CHECK GATE CIRCUIT EMPLOYING TRANSISTOR
DRIVEN BEYOND SATURATION

Filed Jan. 16, 1964

RAYMOND L. NELSON
INVENTOR.

BY R. Frank Smith
David P. Ogden

ATTORNEYS 3,296,460
Patented Jan. 3, 1967

3,296,460

PARITY CHECK GATE CIRCUIT EMPLOYING TRANSISTOR DRIVEN BEYOND SATURATION

Raymond L. Nelson, Rochester, N.Y., assignor to Eastman Kodak Company, Rochester, N.Y., a corporation of New Jersey Filed Jan. 16, 1964, Ser. No. 338,138
7 Claims. (Cl. 307—88.5)

The present invention relates to a parity check gate circuit and more particularly to a logic circuit usable with digital computers and the like for checking the parity of signal information.

Because of their complexity and speed of operation, electronic digital computers and information retrieval equipments using somewhat similar information handling techniques, usually incorporate rather extensive checking circuitry to detect and indicate malfunctions and the like. One of the more common types of checking circuits is a parity check circuit whereby a number momentarily in registry is examined to determine whether the aggregate of its digits have a selected value—odd or even—and whether the result agrees with the correct parity for that number as previously determined. If the parity of the number does not match the parity that is indicated, an error signal is developed. Various functions of computer-like equipment are commonly checked in this manner. The parity of a number may be checked in a one by one fashion by counting the digits that are energized with the final count being odd or even to indicate the parity of that number. This approach is usually much slower than the lowest operating speed of a computer or search equipment whereby such a counting arrangement is not practicable. Several other approaches to this problem have been developed. However, most of them require relatively complex gating circuits embodying a considerable number of components with the total number of components increasing rapidly as a function of the total number of symbols to be handled.

Therefore it is an object of the present invention to provide an improved simplified switching circuit suitable for parity check gating.

In accordance with one embodiment of the present invention a pair of transistors are coupled in such a manner that the second tarnsistor is turned on only when the first transistor is "normally" conductive. The circuitry is such that the first transistor is operable in three conditions—a "saturated" condition, a "normal on" condition and an "off" condition in accordance with the voltage applied to its base. This voltage is received from a pair of signal information sources such that when both informations are at their most positive value the first transistor is saturated. On the other hand, when both of these signal informations are at their most negative value the first transistor is turned off. When one of the signals is at the positive value and the other at the negative value the transistor operates in a "normal on" manner and thus turns on the second transistor. An output function is developed as a function of the operation of the second transistor indicating either that the signals are like or unlike—odd or even.

The subject matter which is regarded as my invention is particularly pointed out and distinctly claimed in the concluding portion of this specification. The invention, however, as to its organization and operation, together with further objects and advantages thereof, will best be understood by reference to the following description, taken in connection with the accompanying drawing, in which:

Figure 1:
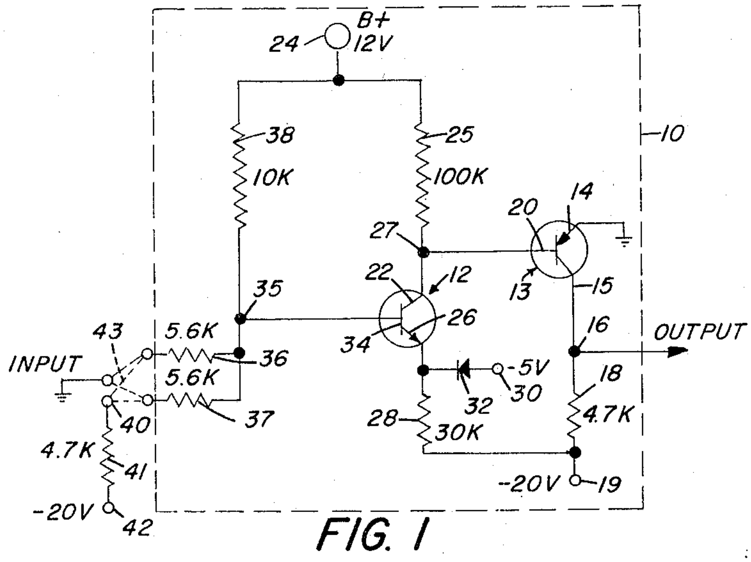
FIG. 1 is a circuit diagram illustrating one embodiment of my invention.

Referring now to the drawing wherein like numbers indicate similar parts, I have shown in FIG. 1 a parity check gate circuit 10 utilizing two transistors 12 and 13 with an emitter electrode 14 of the transistor 13 coupled to ground to clamp the transistor to that voltage level. The collector electrode 15 is coupled to an output signal terminal 16. The output terminal 16 is also coupled through a resistor 18 to a negative voltage terminal 19. When the transistor 13 is conductive, the voltage at the output terminal 16 will be about equal to the ground potential which may be considered to be zero volts and when off, the output voltage will approach that of the negative terminal 19 depending upon the IR drop across the resistor 18. A base electrode 20 of the transistor 13 has applied thereto a variable potential to control its conductance.

To accomplish such control the base 20 is coupled to a collector electrode 22 of the transistor 12 with the collector 22 being coupled to a positive voltage terminal 24 through a resistor 25. The 12 volts appearing at the terminal 24 is referred to hereafter as a bias voltage. Thus, the voltage at the collector 22, the base 20 and a voltage tap or junction indicated as 27 will vary in accordance with the conductance of the transistor 12. An emitter electrode 26 of the transistor 12 is also coupled to the negative voltage terminal 19 through another resistor 28. The emitter electrode 26 is also coupled to a negative voltage terminal 30 by a clamping diode 32.

During one set of operating conditions I prefer to have the voltage at the B+ terminal 24 be 12 volts positive. Under such operating conditions, the voltage appearing at the terminal 19 is 20 volts negative and the voltage appearing at the terminal 30 is 5 volts negative. Thus, it becomes obvious that the transistor 12 becomes conductive at such times as its base electrode 34 is more positive than −5 volts.

The conductance of the transistor 12 is controlled in accordance with the voltage at a junction 35 as applied to the base 34. This voltage is established by a Y resistor voltage divider network including a pair of similar resistors 36 and 37 and a resistor 38. The pair of resistors 36 and 37 are coupled to receive input signals. In the example under consideration these input signals are a magnitude of either zero or 11 volts negative, the −11 volts being considered "even." The resistor 38 couples the junction 35 to the positive power supply 24. Thus it is readily apparent that the voltage at the junction 35 is someplace between −11 volts and +12 volts depending primarily upon the condition of the input signals.

The input signals depend upon the character of the equipment being examined. For instance, if the equipment being examined is providing a pair of digit signals, a ground potential signal may be used to indicate that a digit is energized and a −11 volt signal may be used to indicate that the digit is unenergized. If both digits are conductive, both signals applied across the resistors 36 and 37 will be grounded out or zero volts whereby the junction 35 will be substantially above zero in accordance with the voltage drop across the several resistors 37, 36 and 38 as a function of the positive voltage at the B+ biasing appearing at the terminal 24. Such a condition results in a transistor 12 being saturated whereby the current flow therethrough is in accordance with the resistors 25 and 28. In fact, this particular condition is sometimes referred to as being driven beyond saturation which term is used hereinafter. Under these conditions the voltage at the junction 27 is effectively clamped to the base (34) voltage which is greater than zero. This greater than zero voltage prevents conductance of the transistor 13 which is clamped to ground and conductive only when its base 20 goes negative.

On the other hand, should one of the input signals be —11 volts and the other be grounded, the junction 35 assumes a potential of about 2 volts negative, with the particular sizes of resistors indicated. Such a base voltage, although allowing conductance of current through and an "on" condition in the transistor 12, does not saturate it whereby the junction 27 and the collector electrode 22 assume a potential of slightly less than ground by about half a volt negative. Such a potential at the junction 27 is applied to the base 20 of the transistor 13 to turn it on whereby the output terminal 16 is effectively grounded.

At such times as both signals are negative in the amount of about —11 volts, the junction 35 assumes a negative voltage of about —6 volts. This voltage is less than that applied across the clamping diode 32 to the emitter electrode 26 whereby its voltage is about —5 and the transistor 12 is cut off. During these operating conditions the junction 27 assumes a potential approaching that of the B+ terminal 24 thereby cutting off current flow through the transistor 13 so that the output voltage approaches that of the negative terminal 19. With the output voltage at the terminal 16 being coupled to input circuitry as indicated by the resistance network (such as 36, 37 and 38) the voltage at the terminal 16 will be —11 volts equal to that selectively applied at the input terminals of the resistors 36 and 37.

From the above discussion it becomes apparent that a more negative output signal is obtainable when the inputs are equal either both grounded or both at a —11 volts and that zero volts output is obtained when they are not equal. Thus a parity check of the two input signals is obtained.

Obviously, the output terminal 16 may be used to energize an input terminal of a similar circuit such an arrangement is indicated by a terminal 40, a resistor 41, a terminal 42 and a switch means 43 at the input of the parity check gate circuit 10.

Figure 2:
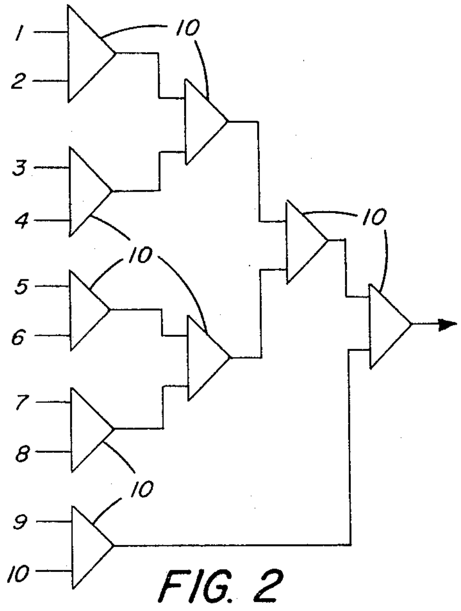
FIG. 2 is a block diagram illustrating one use of the circuit illustrated in FIG. 1.

To obtain a parity check of a digit number having, by way of example, 10 digits as indicated in FIG. 2 a plurality of parity check gate circuits 10 are coupled in parallel with each to receive signals from each pair of digits and are coupled in series with each pair of parity check circuits being coupled to apply their output signals to another parity check gate circuit until only one signal remains, this being a relatively positive or negative indication in accordance with the actual parity check of the entire digit number.

Figure 3:
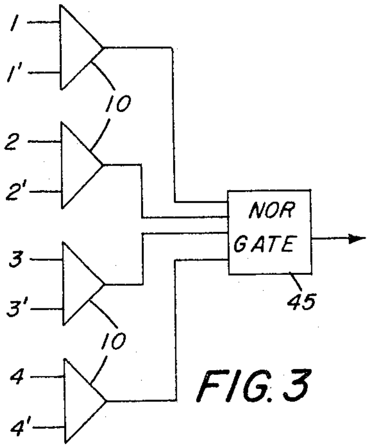
FIG. 3 is a second block diagram illustrating another use of the circuit shown in FIG. 1.

The partiy check gate circuit is also usable to compare digital signals 1, 2, 3, 4, etc. directly to preselected reference signals 1', 2', 3', 4' etc. as indicated in FIG. 3. All of the outputs of check circuits 10 may then be applied to a simple nor gate 45 to be energized only if none of the signals indicate a mismatch. Obviously, other uses may be envisioned for the circuit of my invention without departing from the true spirit and scope thereof.

While we have shown and described particular embodiments of the present invention, other modifications may occur to those skilled in this art. For instance, if it is convenient to use voltages other than zero volts, the ground portion of the circuit 10 may be clamped to a different potential. Thus if inputs are zero and +11 volts respectively, the ground circuit may be clamped to +11 volts. Similarly, the particular voltage and resistor magnitudes specified in the drawing are interdependent. If it is more convenient to use different voltages, the resistors should be modified accordingly. Moreover, all of the voltage polarities may be reversed and the circuit will still function by exchanging NPN and PNP type transistors. It is intended, therefore, to have the appended claims cover all modifications which fall within the true spirit and scope of my invention.

I claim:

1. A parity check gate circuit comprising:
a first transistor having a base, an emitter electrode and a collector electrode;
a Y resistance network having two legs of equal impedance each arranged to receive an input signal and the third leg coupled to a relatively positive bias voltage source;
means coupling the base of said first transistor to the junction of said Y-network;
impedance means coupling the collector electrode to the relatively positive bias voltage source;
impedance means coupling the emitter electrode to a relatively negative voltage source, said impedance means, the bias voltage and the input signals on said network being selected so that when both input signals are most positive, said first transistor is driven beyond saturation whereby the collector electrode is positive as a function of the input signals, and when one is most positive and the other negative, said first transistor is "on," whereby the collector electrode is negative;
a negative clamping means coupled to the emitter electrode to limit the negative excursion thereof to less than the negative excursion of the junction whereby both input signals going negative will turn off said first transistor;
an output terminal coupled by impedance means to the relatively negative voltage source to provide an output signal corresponding to the negative input signal magnitude;
a second transistor coupled to ground said output terminal and thus provide a most positive output signal corresponding to a most positive input signal magnitude; and
means coupling said second transistor to be conductive only when the collector electrode of said first transistor is negative.

2. A parity check gate circuit comprising:
a Y resistance network having two legs of equal impedance each arranged to receive one input signal of a zero potential or a negative potential and the third leg coupled to a positive bias voltage source;
a first transistor having a base coupled to the junction of said network, an emitter impedance coupled to a negative voltage source and a collector impedance coupled to the positive bias voltage source, the impedance couplings and the voltage sources being selected so that when both input signals are zero, said first transistor is driven beyond saturation whereby the collector is positive as a function of the junction voltage and when one signal is zero and the other negative, said first transistor is "on," whereby the collector voltage is negative;
unidirectional current means coupled to the emitter to limit the negative excursion thereof to less than the negative excursion of the junction whereby both input signals going negative will turn "off" said first transistor and its collector voltage becomes positive;
an output terminal coupled by impedance means to the negative voltage source to conditionally provide an output signal corresponding to the negative input signal magnitude;
a second transistor coupled to ground said output terminal and thus provide a zero voltage output signal; and
means coupling said second transistor to be conductive only when the collector of said first transistor is negative.

3. A parity check gate circuit as in claim 2 wherein two such circuits are placed in parallel to determine the parity of four input signals with the output of each being applied as inputs to a third such circuit.

4. A parity check gate circuit comprising:

voltage divider network receptive of a positive bias voltage and two input signals selectively of a zero potential or a negative potential;

a first transistor having a base coupled to a voltage tap of said network, an emitter negatively biased and a collector positively biased, the biases being selected so that when both input signals are zero, said first transistor is driven beyond saturation whereby its collector is positive as a function of its base voltage and when one input signal is zero and the other negative, said first transistor is "on" whereby its collector is negative;

means for limiting the negative excursion of the emitter to less than the negative excursion of the voltage tap whereby both input signals going negative will turn "off" said first transistor so that its collector is positive;

an output terminal coupled to a negative voltage source to conditionally provide an output signal corresponding to the negative input signal magnitude;

a second transistor coupled to ground said output terminal and thus provide a zero voltage output signal; and means coupling said second transistor to be conductive only when the collector of said first transistor is negative.

5. A parity check gate circuit as in claim 4 wherein said coupling means clamps the base of said second transistor directly to the collector of said first transistor.

6. A parity check gate circuit comprising:

a pair of input terminals selectively receptive of a first or second signal of a positive and a negative relative voltage level respectively;

Y-impedance network coupling said terminals to a first voltage source at a voltage bias level more positive than the first signal, said network having equal impedances between a junction thereof and each of said input terminals;

a first transistor having a base coupled to the junction, a collector coupled to said first voltage source and an emitter coupled to a second voltage source of negative polarity and coupled to means limiting the excursion toward the voltage of the second voltage source, whereby the receipt of two positive signals will drive beyond saturation said first transistor, receipt of unlike signals will "turn on" said first transistor, and receipt of two negative signals will "turn off" said first transistor so that relative to that first input signal the collector is positive, negative, positive respectively;

a second transistor having a base coupled to the collector of said first transistor and an emitter clamped to a voltage level equal to the first input signal; and electrical circuit means coupled to the collector electrode of said second transistor for providing an output signal equal to the second input signal when said second transistor is "off" and the first input signal when "on," said voltage sources being selected so that said second transistor is conductive and saturated only when the collector electrode of said first transistor is at a voltage level intermediate to the input signals.

7. A parity check gate circuit comprising:

a pair of input terminals selectively receptive of a first or second input signal of a positive and a negative relative voltage level;

a first transistor having a base resistively coupled to both of said terminals, a collector coupled to a first voltage source and an emitter coupled to a second voltage source and to means limiting the excursion toward the voltage of the second voltage source whereby the receipt of two like signals of one polarity will drive beyond saturation said first transistor, receipt of unlike signals will "turn on" said first transistor, and receipt of two like signals of the opposite polarity will "turn off" said first transistor so that the voltage excursion of the collector is toward the one polarity, intermediate to the input signal voltage levels and toward the one polarity respectively;

a second transistor having a base coupled to the collector of said first transistor and an emitter clamped to a voltage level equal to that of the first input signal; and electrical circuit means coupled to the collector electrode of said second transistor for providing an output equal to the second input signal when the second transistor is off, said voltage sources being selected so that said second transistor is conductive and saturated thereby grounding the output only when the collector electrode of said first transistor is at a voltage level intermediate to the input signals.

References Cited by the Examiner

UNITED STATES PATENTS

| | | | |
|---|---|---|---|
| 3,093,751 | 6/1963 | Williamson | 307—88.5 |
| 3,098,936 | 6/1963 | Isabeau | 307—88.5 |
| 3,103,596 | 9/1963 | Skerritt | 307—88.5 |
| 3,154,696 | 10/1964 | Claessen | 307—88.5 |

ARTHUR GAUSS, *Primary Examiner.*

J. S. HEYMAN, *Assistant Examiner.*